Patented Nov. 14, 1922.

1,435,505

UNITED STATES PATENT OFFICE.

ARCHIBALD SCOTT, OF HUMBOLDT, ARIZONA, ASSIGNOR TO WESTERN METALLURGICAL COMPANY, OF HUMBOLDT, ARIZONA, A CORPORATION OF DELAWARE.

PROCESS FOR THE RECOVERY OF METALLIC VALUES FROM FUME PRECIPITATE.

No Drawing.   Application filed November 4, 1919. Serial No. 335,752.

*To all whom it may concern:*

Be it known that I, ARCHIBALD SCOTT, a citizen of the United States, residing at Humboldt, in the county of Yavapai and State of Arizona, have invented certain new and useful Improvements in Processes for the Recovery of Metallic Values from Fume Precipitate, of which the following is a specification.

This invention relates to the recovery of metallic values from fume precipitate obtained by collection by the so-called Cottrell process, or otherwise, from fume containing volatilized chlorides of various metals, such fume being produced by subjecting the ores of such metals to heat in the presence of a chloridizing agent. Such fume precipitate is neither mechanically nor metallurgically in proper form to be susceptible of further treatment by any established practice or method without great loss of values and disproportionately heavy expense, therefore.

The main object of the present invention is to provide for the treatment of the fume precipitate in such manner as to recover substantially all of the valuable metals contained therein at a low cost and in a product that can subsequently be treated by established metallurgical practice to convert the metals into products valuable in the arts and industries.

The material to which my process particularly applies is the finely divided precipitate composed essentially of solid particles of chloride and oxychloride of various metals, as for example, gold, silver, copper, lead, zinc, nickel, etc., also more or less sulphur and certain impurities transferred mechanically from the raw material treated. Such a precipitate is in practice usually obtained by the application of the so-called Cottrell process for electrostatic precipitation of fumes containing the volatilized chlorides of the metals mentioned or other metals. Such precipitate may also be obtained by other methods, as for example, bag houses, scrubbers, etc., and, therefore, it is not my intention to limit my invention to the Cottrell precipitate only, nor to the treatment of the metals mentioned above. The precipitate may be moistened, if desired, or mixed with oil, or other substance, to put it in suitable form for transportation or furnace treatment and to prevent excessive dust loss.

The first step in my process is to mix the precipitate with a sufficient quantity of calcium oxide or calcium carbonate to satisfy the chlorine in the precipitate, and to form a calcium chloride slag upon fusion of the mixture. Sufficient carbon in the form of coke, coal, or fuel oil, or similar carbonaceous substance, is also added to reduce the metals contained and to maintain a reducing atmosphere during the smelting of the mixture. In place of calcium oxide or carbonate there may be substituted sodium carbonate or bicarbonate, or potassium carbonate in treatment, with similar result, or generally, any basic reagent, or reagent containing a base capable of reacting with the metallic chlorides in the precipitate to form a chloride of such base, may be used.

The mixed charge is then fed into a suitable furnace and heated in a reducing atmosphere until the non-metallic elements are combined with the calcium or other base and slagged off, and the metallic element or elements are reduced partly to metals or mixed metals and partly to matte, sulfur being assumed to be present in such amount that a certain proportion of the metals is recovered as matte, in metallic form, as bullion, this metallic product and the matte being separated from the slag containing calcium chloride by slagging off the latter, as stated. If said bullion is impure, it is subsequently treated by any of the well known refining processes or by subsequent converting and refining as may seem most suitable and to produce the comparatively pure metals of commerce.

The matte is separated from the bullion by pouring or skimming, and subsequently treat the separated matte in a Bessemer converter for the elimination of sulphur and the production of bullion.

The chemical reactions involved in my process are as follows:

$$MCl_2 + CaCO_3 = CaCl_2 + MO + CO_2$$
$$2MO + C = 2M + CO_2$$
$$2MCl_2 + 2CaO + 2S = 2CaCl_2 + M_2S + SO_2$$

What I claim is:

1. The process of treating fume precipitate containing metallic chlorides and also containing sulfur, which consists in adding thereto a reducing agent and a basic reagent capable of combining with the chlorine of the precipitate and heating the mixture in

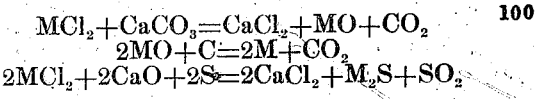

a reducing atmosphere to reduce a portion of the metal of such chlorides to metallic form and to form a matte containing another portion of such metal and a slag containing the chloride of such basic reagent.

2. The process of treating fume precipitate containing metallic chlorides and also containing sulfur, which consists in adding thereto a reducing agent and a reagent containing a base capable of combining with the chlorine of the precipitate to form a chloride of such base, and heating the mixture to reduce a portion of the metal to be recovered and form a matte containing another portion of such metal and a slag containing said chloride of said base, separating the metallic product, the matte and the slag, and treating the matte to produce metal.

In testimony whereof I have hereunto subscribed my name this 30th day of October, 1919.

ARCHIBALD SCOTT.